United States Patent [19]
Kim

[11] Patent Number: 5,940,638
[45] Date of Patent: Aug. 17, 1999

[54] APPARATUS AND METHOD FOR READING PHOTOGRAPHIC INFORMATION FOR AN ADVANCED PHOTO SYSTEM CAMERA

[75] Inventor: Byung-Su Kim, Kyeongsongnam-do, Rep. of Korea

[73] Assignee: Samsung Aerospace Industries, Ltd., Kyeongsangnam-do, Rep. of Korea

[21] Appl. No.: 08/998,477

[22] Filed: Dec. 29, 1997

[30] Foreign Application Priority Data

Dec. 30, 1996 [KR] Rep. of Korea ............... 96-78001

[51] Int. Cl.⁶ ............................................. G03B 7/24
[52] U.S. Cl. ................................... 396/207; 396/515
[58] Field of Search .................................. 396/207, 515

[56] References Cited

U.S. PATENT DOCUMENTS

| | | | |
|---|---|---|---|
| 5,030,978 | 7/1991 | Stoneham et al. | 396/207 |
| 5,032,854 | 7/1991 | Smart et al. | 354/21 |
| 5,321,455 | 6/1994 | Cocca | 396/207 |
| 5,347,334 | 9/1994 | Smart et al. | 396/515 |
| 5,497,213 | 3/1996 | Yoshida et al. | 396/207 |
| 5,548,359 | 8/1996 | Wakabayashi | 396/207 |
| 5,552,843 | 9/1996 | Yokonuma et al. | 396/207 |
| 5,812,894 | 9/1998 | Yoshida et al. | 396/207 |

*Primary Examiner*—Russell Adams
*Attorney, Agent, or Firm*—Finnegan, Henderson, Farabow, Garrett & Dunner, L.L.P.

[57] ABSTRACT

An apparatus and a method for reading photographic information for an advance photo system camera utilizes a single optical sensor to record the photographic information on a data disk contained in a film cartridge. The apparatus further includes an information reading device for reading the photographic information and for generating a signal according to the photographic information. A film transport device is also used for rotating a film spool to wind a film into and out of the film cartridge. The apparatus further includes a controller for determining the state of the film cartridge and for setting a stop position of the film spool according to the current state of the film cartridge. The recorded photographic information can be easily read, thus allowing the user to easily determine the state of the film cartridge.

16 Claims, 12 Drawing Sheets

APPARATUS AND METHOD FOR READING PHOTOGRAPHIC INFORMATION FOR AN ADVANCED PHOTO SYSTEM CAMERA

BACKGROUND OF THE INVENTION

1. Field of the Invention

The present invention relates to an apparatus and method for reading photographic information for an advanced photo system (APS) camera, and more particularly, to an apparatus and method for easily reading photographic information, which is recorded on a data disk contained in a film cartridge, by utilizing a single optical sensor.

2. Description of the Prior Art

Recently, photosensitive films with magnetic tracks have been developed in which photographic data, such as the F-number and the shutter speed, can be magnetically recorded. In conventional APS cameras using this type of film, the photographic data on each frame of the film is recorded in the magnetic tracks after a picture is taken. The APS camera also represents information, such as the current state of a film cartridge and film sensitivity, based on the parking position of a data disk contained in the film cartridge. The data disk is a visual exposure indicator (VEI) which describes the current state of the film cartridge: an unexposed state, a partial exposed state, an exposed state or a processed state. The current state will also be referred to hereinafter as the VEI state. The data disk is formed on an end of the spool of the film cartridge. The APS camera reads and determines the VEI state of the film cartridge by detecting the position of the data disk, that is, the rotational angle of the data disk.

A controller of the APS camera detects the rotational angle of the film cartridge when the film cartridge is loaded into the APS camera. If the film cartridge is in the unexposed state, the first frame of the film is set at a predetermined position. If the film cartridge is in the partial exposed state, the first unexposed frame of the film is set at the predetermined position. If the film cartridge is in the exposed state, the controller indicates that the film is exposed. As shown in FIG. 1, a conventional APS camera has optical sensors 10 and 12 for reading a bar code recorded on the data disk. The controller (not shown) determines the VEI state and parks a film cartridge spool at the predetermined position according to the VEI state. However, conventional APS cameras comprise two optical sensors for reading an information recorded on the data disk, thus resulting in an APS camera structure that is relatively complicated and expensive. Further, conventional APS cameras do not clearly distinguish between an exposed state and a processed state, so a user is unable to ascertain whether the film has been developed or not.

SUMMARY OF THE INVENTION

It is an object of the present invention to provide an apparatus and a method for reading photographic information for an APS camera. The apparatus reads the photographic information recorded on a data disk contained in a film cartridge by utilizing a single optical sensor.

To achieve the object and in accordance with the purpose of the invention, as embodied and broadly described herein, the invention comprises information reading means for reading photographic information stored on a film cartridge and for generating a signal according to the photographic information, and film transport means for rotating a film spool to wind a film into and out of the film cartridge. The invention additionally comprises controller means for determining a current state of the film cartridge based on the signal generated by the information reading means by determining whether a level of the signal generated from the information reading means changes while a predetermined setup time elapses from a start of film rotation, and for setting a stop position of the film spool according to the current state of the film cartridge.

Also, to achieve this object, the present invention comprises the steps of reading photographic information from a film when a film cartridge is loaded, determining a state of the film cartridge according to the photographic information by determining whether a signal level corresponding to the read photographic information changes during a predetermined setup time beginning from the start of film rewinding, and transporting the film to a predetermined position according to the state of the film cartridge.

BRIEF DESCRIPTION OF THE DRAWINGS

The accompanying drawings, which are incorporated in and constitute a part of this specification, illustrate one embodiment of the invention and, together with the description, serve to explain the principles of the invention. In the drawings.

DETAILED DESCRIPTION OF THE PREFERRED EMBODIMENTS

Reference will now be made in detail to the present preferred embodiment of the invention, an example of which is illustrated in the accompanying drawings.

Figure 1:
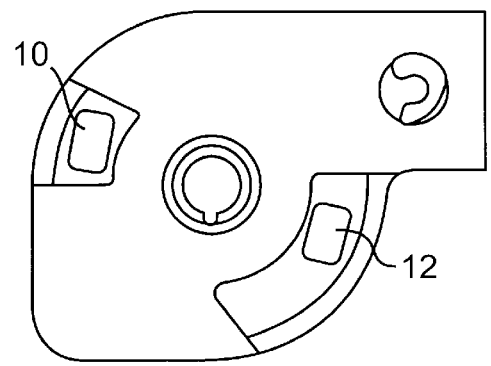
FIG. 1 is a top view showing a film cartridge and two optical sensors used in a conventional APS camera.
Figure 2:
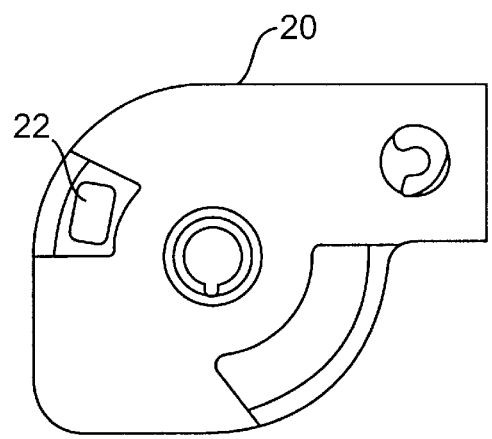
FIG. 2 is a top view showing a film cartridge and one optical sensor used in an APS camera consistent with the present invention.

FIG. 2 shows film cartridge 20 mounted in an APS camera and optical sensor 22 of the an APS camera. The single optical sensor 22 design described herein differs from the conventional APS camera design shown in FIG. 1, which requires two optical sensors.

Figure 3:
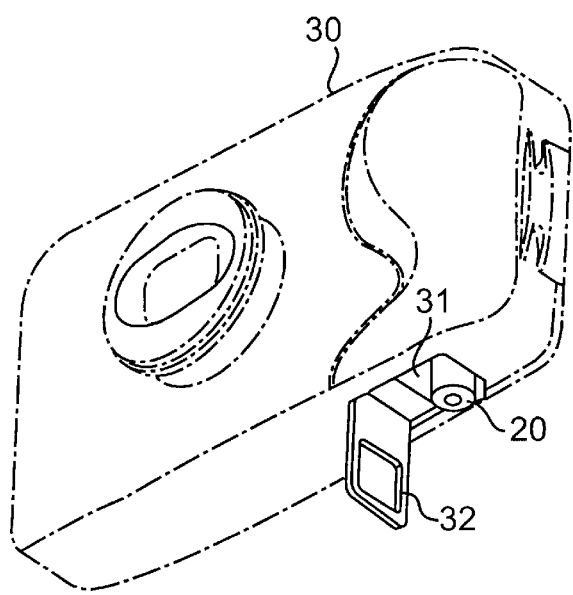
FIG. 3 is a perspective view of an APS camera, in which a film cartridge is loaded in accordance with a preferred embodiment of the present invention.

As illustrated in FIG. 3, film cartridge 20 loads into an APS camera body 30 through an opening 31 formed in a camera body wall. The opening leads to a chamber formed in camera body 30. Once loaded, film cartridge 20 is secured by into the chamber by a door 32 hinged on the bottom plane of camera body 30.

Figure 4:
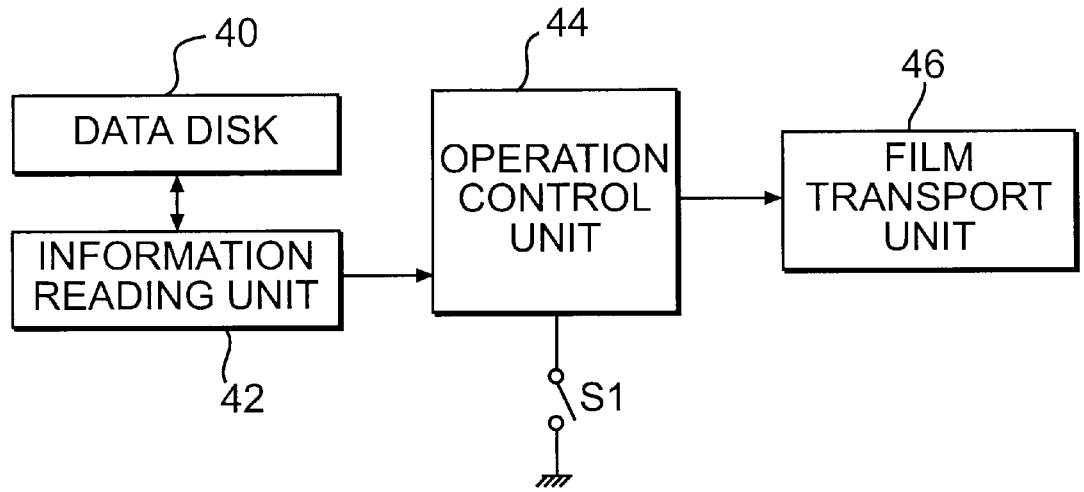
FIG. 4 is a block diagram of an apparatus for reading photographic information for an APS camera in accordance with a preferred embodiment of the present invention.

FIG. 4 is a block diagram of an apparatus for reading photographic information for an APS camera in accordance with the present invention. As shown in FIG. 4, the apparatus comprises a chamber switch S1, a data disk 40 formed on a film cartridge for storing photographic information (e.g., the VEI state of a film cartridge and a film sensitivity), an information reading unit 42 for reading photographic information stored on data disk 40, an operation control unit 44 for controlling operation of the apparatus, and a film transport unit 46 for winding a film into and out of the film cartridge. Chamber switch S1, information reading unit 42, operations control unit 44 and film transport unit 46 are components formed in APS camera body 30.

Operation control unit 44 connects to chamber switch S1 and information reading unit 42. When door 32 is closed, operation control unit 44 turns chamber switch S1 to an "on" position. Subsequently, under the control of operation control unit 44, information reading unit 42 reads photographic information recorded on data disk 40 using optical sensor 22. In addition to the foregoing duties, operation control unit 44 determines the VEI state of film cartridge 20 when the cartridge is loaded in the chamber and controls film transport unit 46 so that the film is transported or the spool is parked at a predetermined position according to the VEI state.

Figure 5:
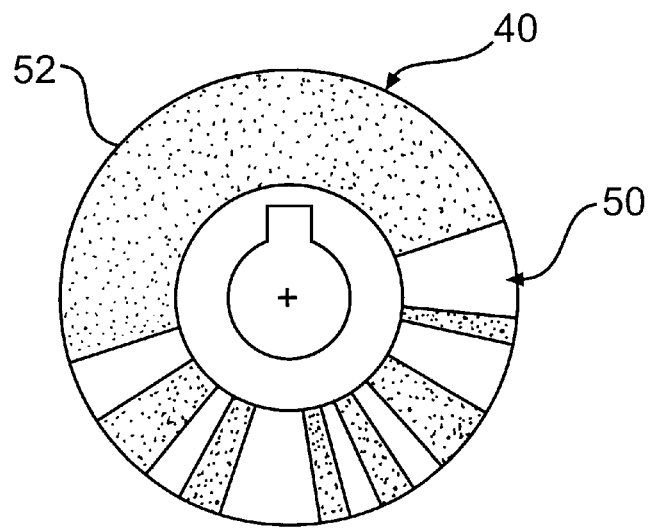
FIG. 5 is a diagram showing the recording pattern of a data disk for an APS camera in accordance with a preferred embodiment of the present invention.

Data disk 40 is formed on a top end of film cartridge 20. As shown in FIG. 5, photographic information is recorded on the data disk 40 in a radial bar code format. Data disk 40 includes a recording zone 50 and a non-recording zone 52 for photographic information, the latter being known as a "quiet zone".

Figure 6A:
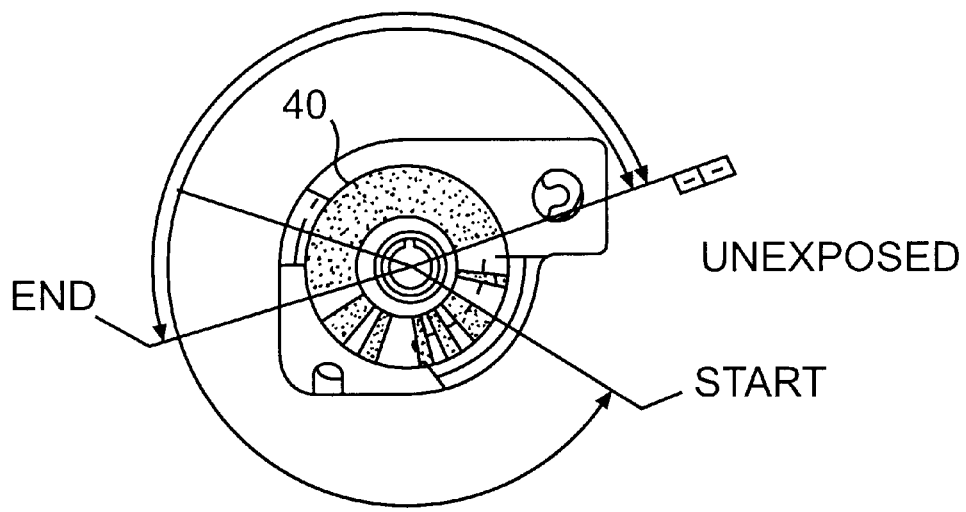
FIGS. 6a–6d are diagrams showing the rotational angle of the data disk based on a VEI state in accordance with a preferred embodiment of the present invention.
Figure 6B:
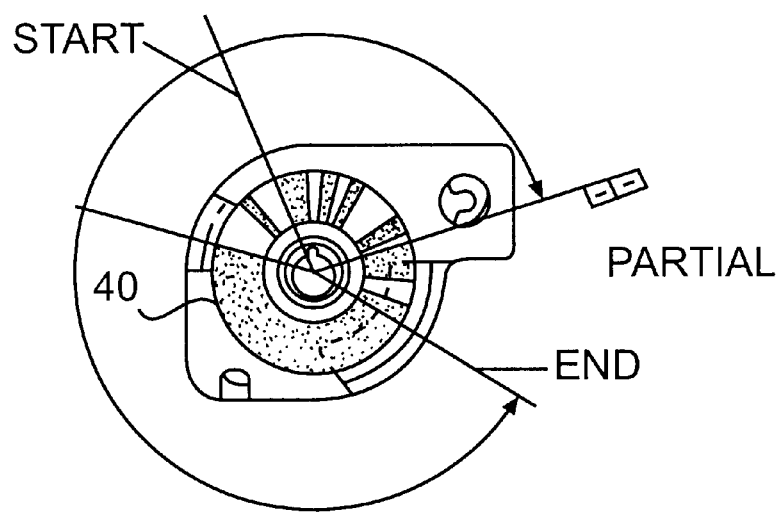
Figure 6C:
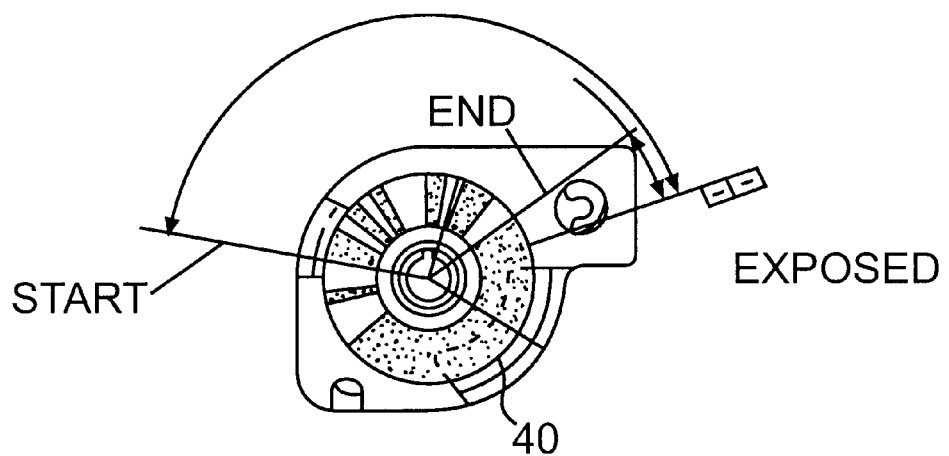
Figure 6D:
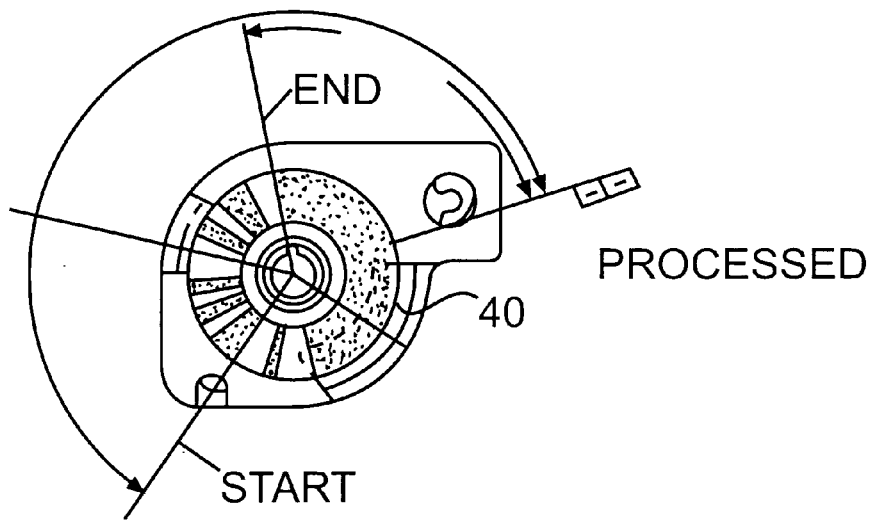

FIGS. 6a–6d are diagrams showing the rotational angle of data disk 40 based on a VEI state in accordance with a preferred embodiment of the present invention. The photographic information determines the VEI state of the film cartridge (e.g., an unexposed state, a partial state, an exposed state, and a processed state), the film sensitivity, and the number of frames of the film. Specifically, FIG. 6a shows the rotational angle of data disk 40 based on an unexposed VEI state, FIG. 6b shows the rotational angle of data disk 40 based on a partial exposed VEI state, FIG. 6c shows the rotational angle of data disk 40 based on an exposed VEI state, and, finally, FIG. 6d shows the rotational angle of data disk 40 based on a processed VEI state. The rotational angle of data disk 40 varies for each VEI state as illustrated in FIGS. 6a–6d.

Referring to FIGS. 7–15, operation of the operation control unit 44 for reading photographic information for an APS camera is described in detail below.

Figure 7:
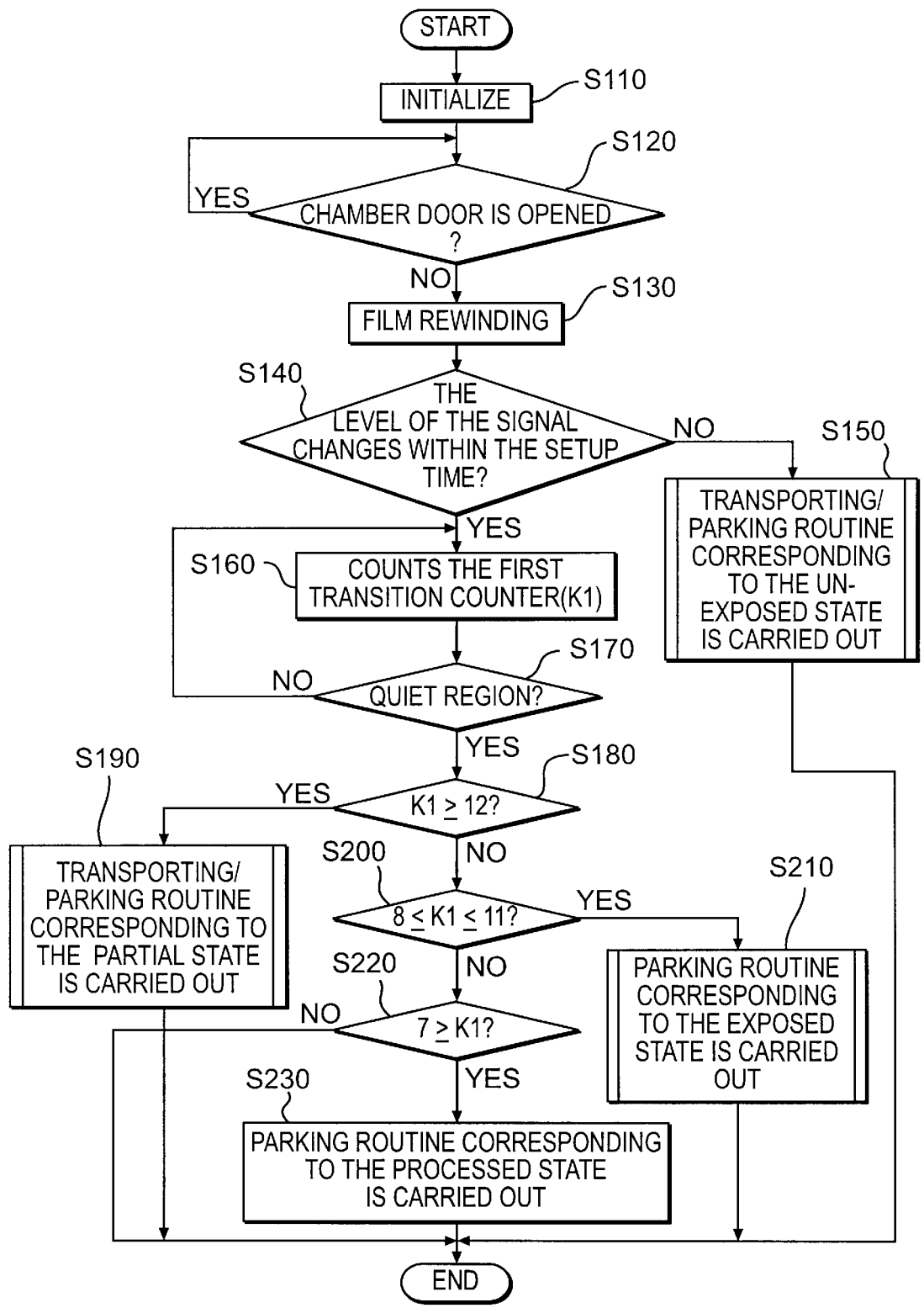
FIG. 7 is a flowchart showing an operation for reading photographic information for an APS camera in accordance with a preferred embodiment of the present invention.
Figure 8A:
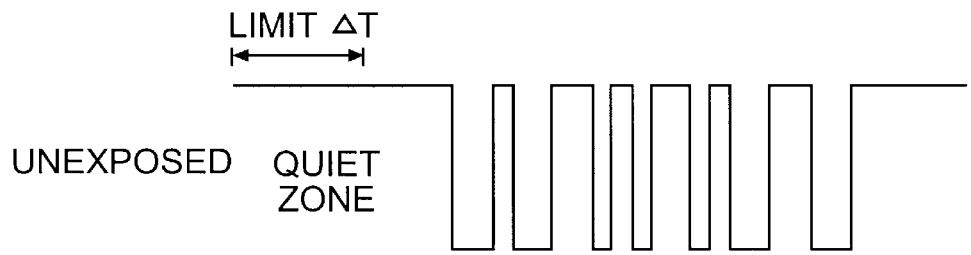
FIG. 8 is a time chart for a signal generated from the information reading unit of the apparatus of FIG. 2.
Figure 8B:
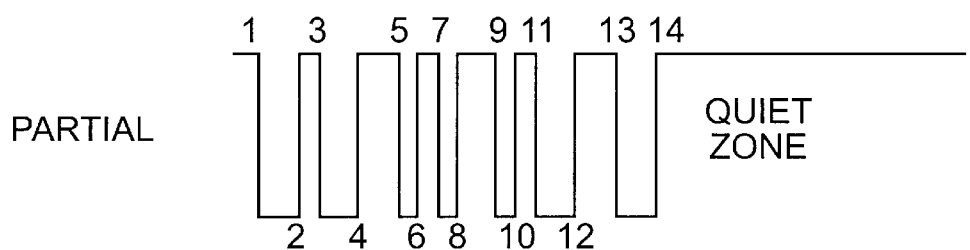
Figure 8C:
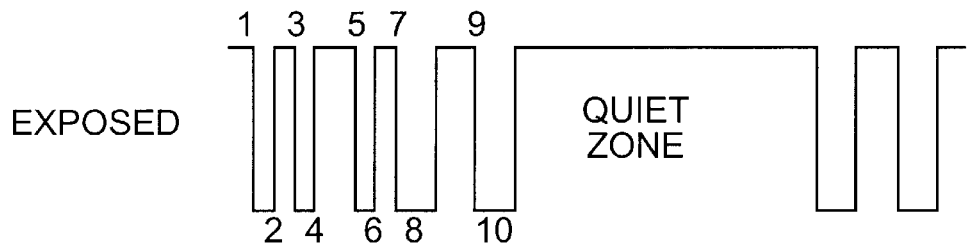
Figure 8D:
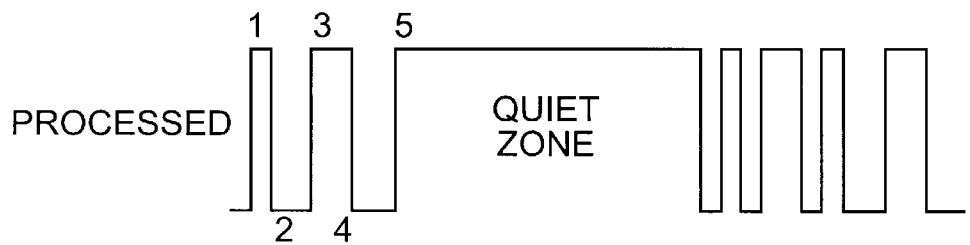

FIG. 7 is a flowchart showing an operation for reading photographic information for an APS camera in accordance with a preferred embodiment of the present invention. The operation begins at step S110 At step S110, operation control unit 44 initializes settings, such as a first transition counter K1 and a second transition counter K2, in the apparatus shown in FIG. 4. Transition counters K1 and K2 are used for counting the transition of the level of a signal generated from information reading unit 42. An initial value of the transition counters is "0."

Chamber switch S1 turns on when film cartridge 20, shown in FIG. 3, is loaded into APS camera body 30 and chamber door 32 is closed. At step S120, it is determined whether chamber door 32 is opened. If chamber door 32 is closed, the operation proceeds to step S130. At step S130, operation control unit 44 rewinds the film. Operation control unit 44 reads photographic information recorded on data disk 40 during the rewinding.

While rewinding the film, optical sensor 22 of information reading unit 42 emits light on data disk 40. Data disk 40 includes the recording zone for photographic information which is recorded in a radial bar code format. As shown in FIG. 5, the radial bar code comprises a plurality of bars, which includes wide bars and narrow bars. Further, the bars include white bars and black bars. The white bars reflect light emitted from optical sensor 22, while the black bars absorb light. Accordingly, optical sensor 22 receives light reflected by the white bars and generates a signal according to the light.

Next, at step S140, operation control unit 44 determines whether the level of the signal generated from information reading unit 42 changes during an elapsed setup time ΔT beginning at the start of film rewinding. As shown in FIG. 8, if the level of the signal generated from information reading unit 42 does not change while setup time ΔT elapses, operation control unit 44 considers the VEI state of the film cartridge 20 as an unexposed state at step S150. Accordingly, operation control unit 44 carries out a transporting/parking routine corresponding to the unexposed state at step S150.

Figure 9:
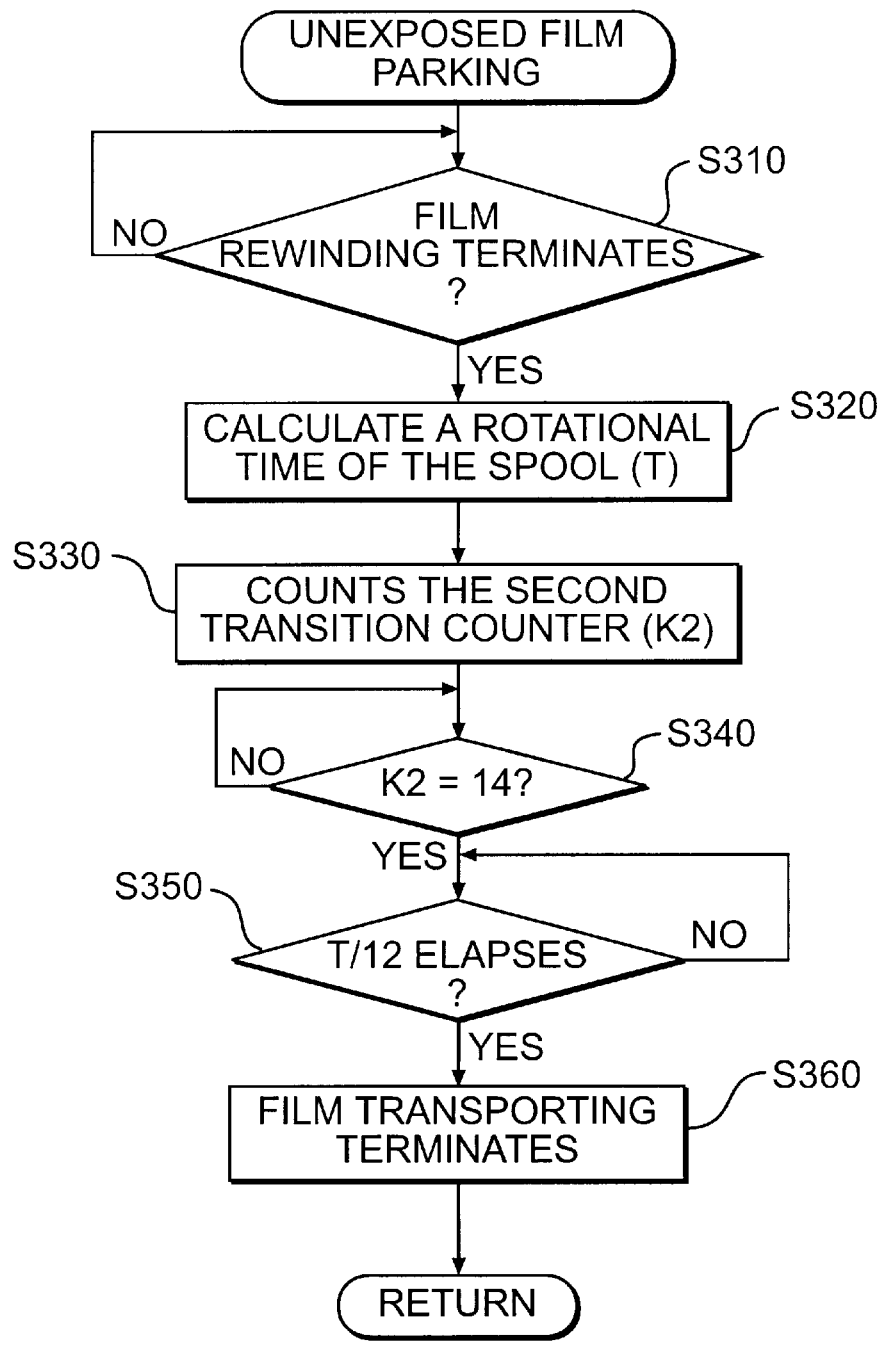
FIG. 9 is a flowchart showing an operation when the VEI state is an unexposed state in accordance with a preferred embodiment of the present invention.
Figure 10:
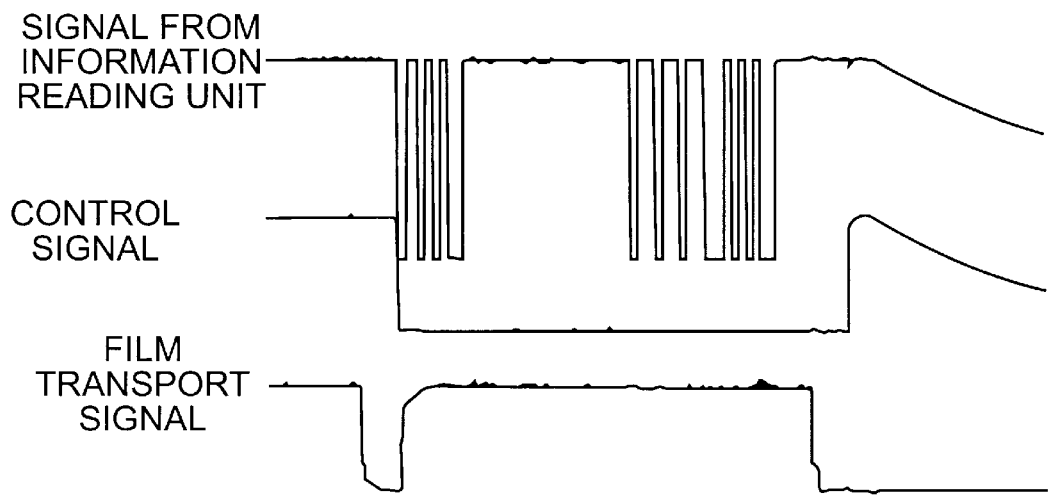
FIG. 10 is a time chart for the operation of the apparatus of FIG. 2 when the VEI state is an unexposed state.
Figure 12:
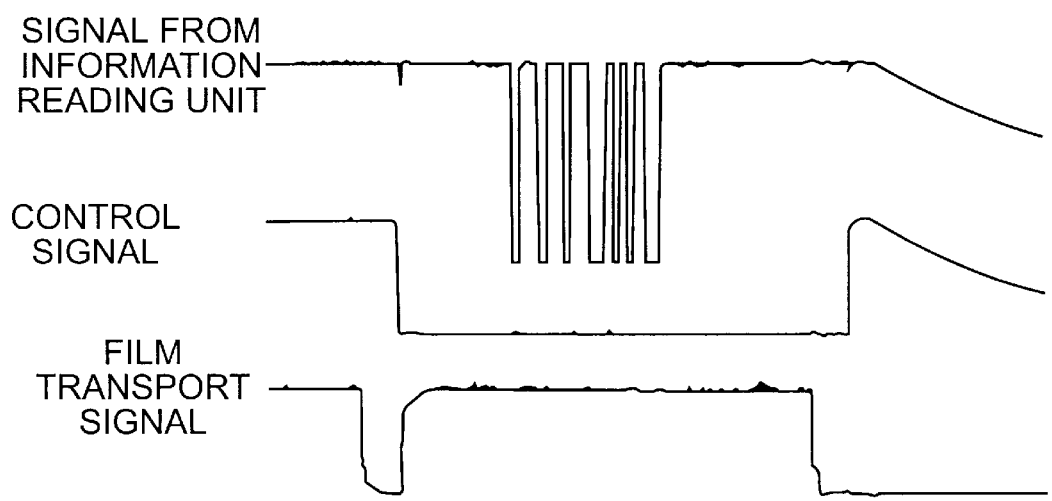
FIG. 12 is a time chart for the operation of the apparatus of FIG. 2 when the VEI state is a partial exposed state.

The transporting/parking routine corresponding to the unexposed state shown in FIG. 9 is described below. At step S310, operation control unit 44 determines whether film rewinding is complete. If so, operation control unit 44 calculates a rotational time T of a spool of film cartridge 20 by utilizing the signal generated from information reading unit 42, and starts transporting the film at step S320.

Next, at step S330, operation control unit 44 receives a signal generated from information reading unit 42 in rewinding the film and determines whether the signal level has changed. If the signal level has changed, operation control unit 44 increases second transition counter K2 by "1." At step S340, operation control unit 44 determines whether second transition counter K2 is equal to a first setup value. Here, the first setup value is "14." If second transition counter K2 is not equal to the first setup value of "14", operation control unit 44 continues to drive film transport unit 46 and counts the transition level of the signal generated from information reading unit 42 until second transition counter K2 is equal to the first setup value. If second transition counter K2 is equal to the first setup value, operation control unit 42 determines whether a predetermined time elapses at step S350. Here, the predetermined time is one-twelfth of rotational time T of the spool calculated at step S320. If one-twelfth of a rotational time T of the spool elapses, operation control unit 44 stops driving film transport unit 46 at step S360. Then, the transporting/parking routine returns to the main routine. When the VEI state is in the unexposed state, a time chart for the film parking operation has the characteristics shown in FIG. 10.

At step S140, if the level of the signal generated from information reading unit 42 changes while setup time ΔT elapses, operation control unit 44 determines whether the level of the signal generated from information reading unit 42 has changed. If the signal level has changed, operation control unit 44 increases the first transition counter K1 by "1" at step S160. A t step S170, operation control unit 44 determines whether the quiet zone is detected. If the quiet zone is not detected, operation control unit 44 continues to drive film transport unit 46 and counts the transition of the signal level. If the quiet zone is detected, operation control unit 44 determines whether the first transition counter K1 is more than a second setup value at step S180. Here, the second setup value is "12." If first transition counter K1 is more than the second setup value of "12", operation control unit 44 considers the VEI state of the film cartridge 20 as the partial exposed state and carries out a transporting/parking routine corresponding to the partial exposed state at step S190.

Figure 11:
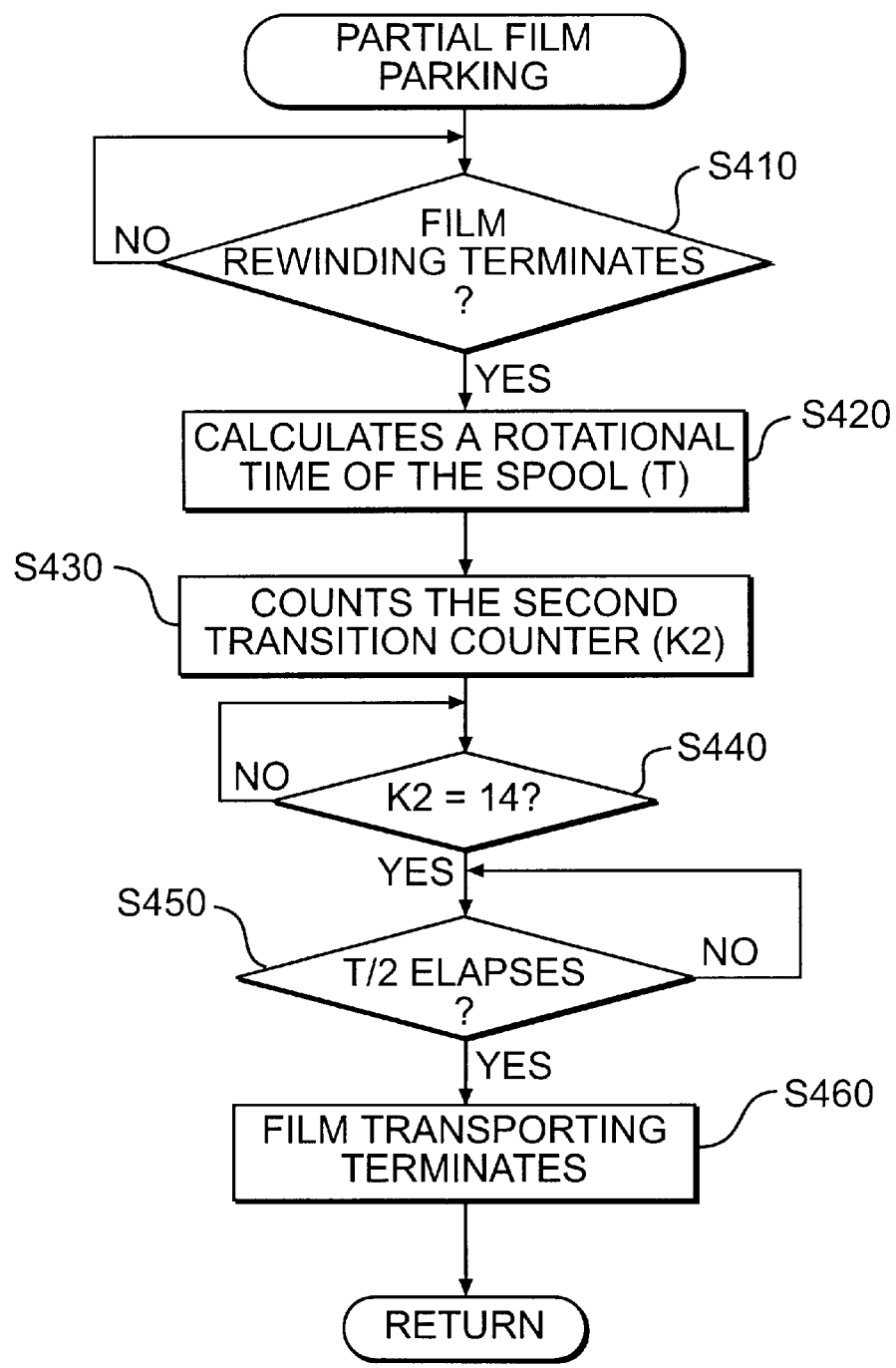
FIG. 11 is a flowchart showing an operation when the VEI state is a partial exposed state in accordance with a preferred embodiment of the present invention.

The transporting/parking routine corresponding to the partial exposed state shown in FIG. 11 is described below. At step S410, operation control unit 44 determines whether film rewinding ends. If film rewinding is complete, operation control unit 44 calculates a rotational time T of the spool of the film cartridge 20 by utilizing the signal generated from information reading unit 42, and starts transporting the film at step S420.

Next, at step S430, operation control unit 44 receives a signal generated from information reading unit 42 in winding the film and determines whether the signal level has changed. If the signal level has changed, operation control unit 44 increases the second transition counter K2 by "1." At step S440, operation control unit 44 determines whether second transition counter K2 is equal to the first setup value of "14". If second transition counter K2 is not equal to the first setup value, operation control unit 44 continues to drive film transport unit 46 and counts the transition level of the signal generated from information reading unit 42 until the second transition counter K2 is equal to the first setup value. If second transition counter K2 is equal to the first setup value, operation control unit 44 determines whether a predetermined time elapses at step S450. Here, the predetermined time is one-half the rotational time T of the spool calculated at step S420. If one-half the rotational time T of the spool elapses, operation control unit 44 stops driving film transport unit 46 at step S460. Then, the transporting/parking routine returns to the main routine. When the VEI state is the partial exposed state, a time chart for the film parking operation has the characteristics shown in FIG. 12.

If first transition counter K1 is not more than the second setup value of "12" at step S180, operation control unit 44 determines whether the first transition counter K1 is more than a third setup value, but not more than a fourth setup value at step S200. Here, the third setup value is "8" and the fourth setup value is "11." If first transition counter K1 is more than the third setup value "8" but not more than the fourth setup value of "11", operation control unit 44 considers the VEI state of the film cartridge 20 as the exposed state and carries out a parking routine corresponding to the exposed state at step S210.

Figure 13:
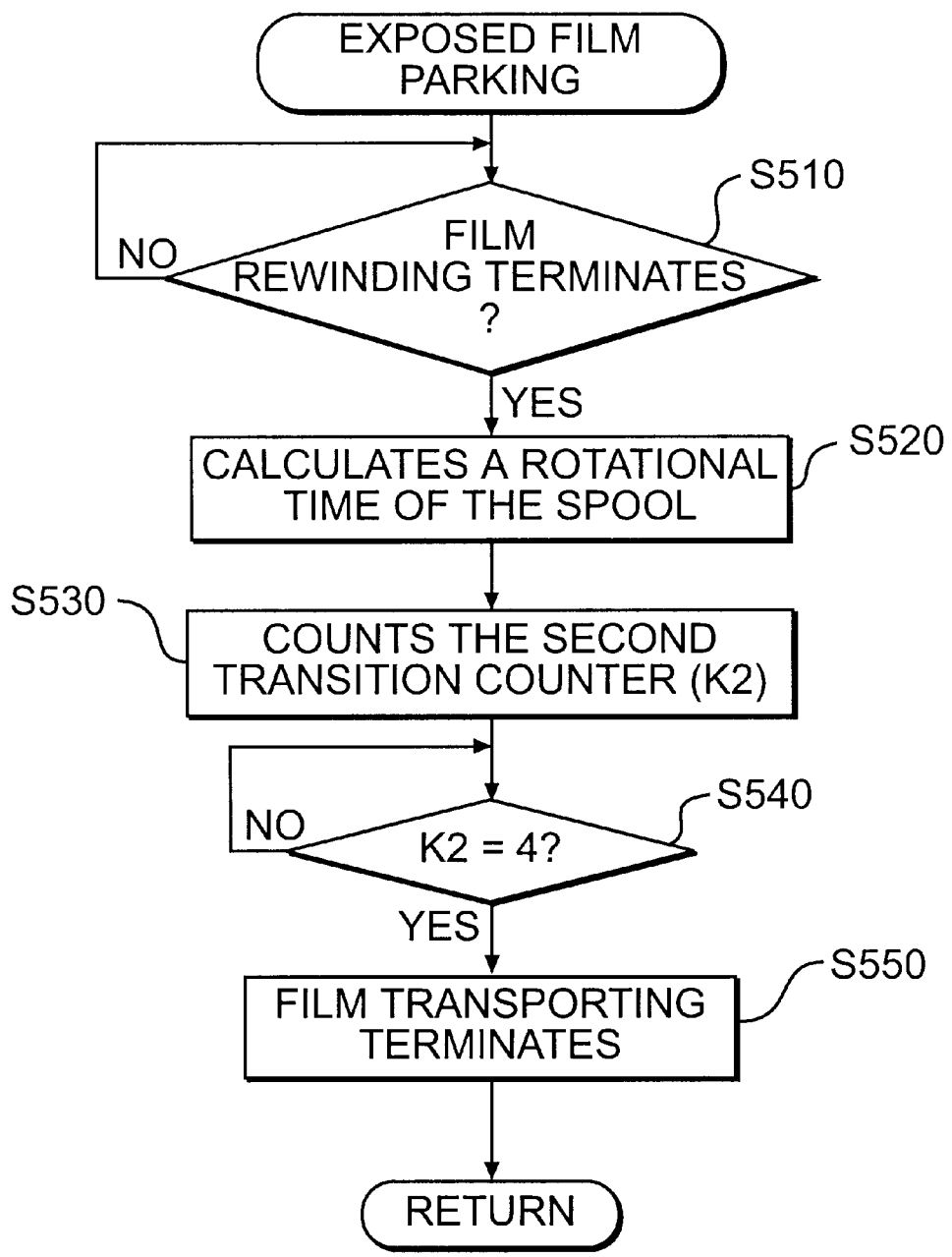
FIG. 13 is a flowchart showing an operation when the VEI state is an exposed state in accordance with a preferred embodiment of the present invention.
Figure 14:
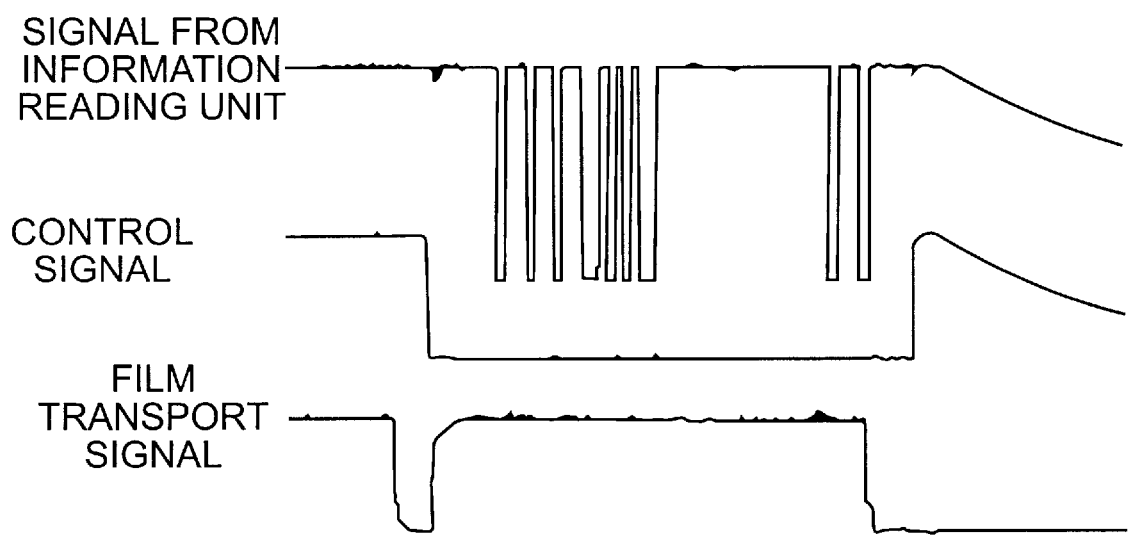
FIG. 14 is a time chart for the operation of the apparatus of FIG. 2 when the VEI state is an exposed state.

The parking routine corresponding to the exposed state shown in FIG. 13 is described below. At step S510, operation control unit 44 determines whether film rewinding is complete. If so, operation control unit 44 calculates a rotational time T of the spool of the film cartridge 20 by utilizing the signal generated from information reading unit 42, and starts transporting the film at step S520.

Next, at step S530, operation control unit 44 receives a signal generated from information reading unit 42 during the film rewinding and determines whether the signal level has changed. If the signal level has changed, operation control unit 44 increases the second transition counter K2 by "1." At step S540, operation control unit 44 determines whether second transition counter K2 is equal to a fifth setup value. Here, the fifth setup value is "4." If second transition counter K2 is not equal to the fifth setup value of "4", operation control unit 44 continues to drive film transport unit 46 and counts the transition level of the signal generated from information reading unit 42 until second transition counter K2 is equal to the fifth setup value. If second transition counter K2 is equal to the fifth setup value, operation control unit 44 stops driving the film transport unit 46 at step S550. Then, the parking routine returns to the main routine. When the VEI state is the exposed state, a time chart for the operation of the film parking has the characteristics shown in FIG. 14.

Referring back to FIG. 7, at step S200, if first transition counter K1 is not more than the third setup value of "8", operation control unit 44 determines whether first transition counter K1 is not more than a sixth setup value at step S220. Here, the sixth setup value is "7." If the first transition counter is not more than the sixth setup value of "7", operation control unit 44 considers the VEI state of film cartridge 20 as a processed state and carries out a parking routine corresponding to the processed state at step S230.

Figure 15:
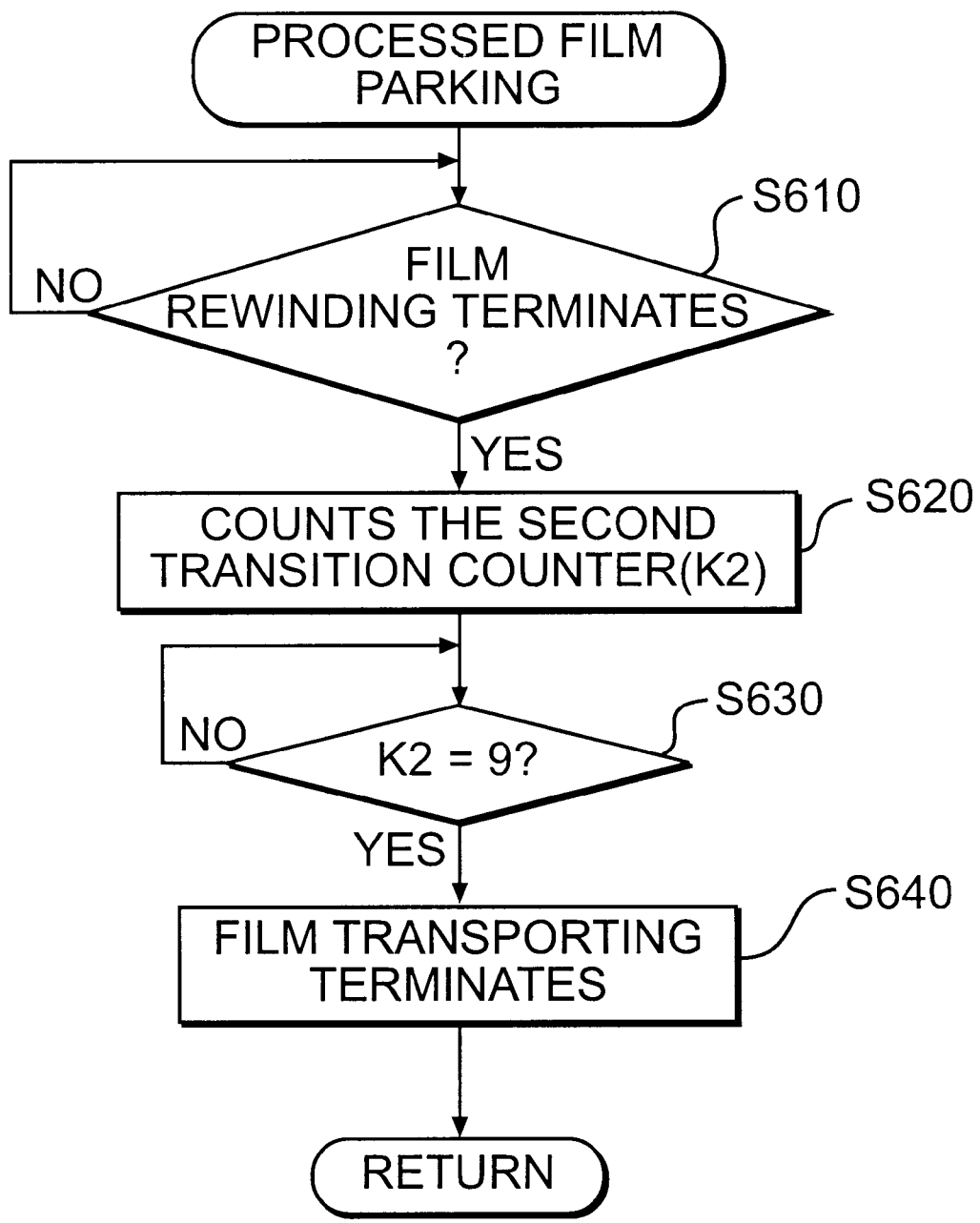
FIG. 15 is a flowchart showing an operation when the VEI state is a processed state in accordance with a preferred embodiment of the present invention.

The parking routine corresponding to the processed state shown in FIG. 15 is described below. At step S610, operation control unit 30 determines whether film rewinding is complete. If so, operation control unit 44 starts transporting the film, receives a signal generated from information reading unit 42, and determines whether the signal level has changed at step S620. If the signal level has changed, operation control unit 44 increases second transition counter K2 by "1." At step S630, operation control unit 44 determines whether second transition counter K2 is equal to a seventh setup value. Here, the seventh setup value is "9." If second transition counter K2 is not equal to the seventh setup value of "9", operation control unit 44 continues to drive film transport unit 46 and counts the transition levels of the signal generated from information reading unit 42 until second transition counter K2 is equal to the seventh setup value. If second transition counter K2 is equal to the seventh setup value, operation control unit 44 stops driving the film transport unit 46 at step S640. Then, the parking routine returns to the main routine.

Consequently, operation control unit 44 determines the VEI state according to the number of level transitions of the signal generated from information reading unit 42 and the timing of the first transition level of the signal in rewinding the film. Next, operation control unit 44 parks the film at a position for taking a photograph according to the determined VEI state.

As described above, since photographic information recorded on data disk 40 contained in film cartridge 20 can be easily read using one optical sensor 22, the cost of production is reduced and the user is prevented from erroneously detecting the VEI state.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An apparatus for reading photographic information stored on a film cartridge for an advanced photo system camera, comprising:

information reading means comprising an optical sensor for reading the photographic information and for generating a signal according to the photographic information; film transport means for rotating a film cartridge spool to wind a film into and out of the film cartridge; and operation control means for determining a state of the film cartridge based on the signal generated by the information reading means by determining whether a level of the signal generated from the information reading means changes while a predetermined setup time elapses from a start of film rotation, and for setting a stop position of the film cartridge spool according to the state of the film cartridge, wherein, when said operation control means determines that a level of the signal generated from the information reading means does not change while a predetermined setup time elapses from the start of film rotation, the operation control means identifies the state of the film cartridge as an unexposed state.

2. The apparatus of claim 1, wherein, in response to identifying the state of film cartridge to be the unexposed state, said operation control means calculates a rotational time of the film cartridge spool when film rotation is complete, drives the film transport means for winding the film, and stops driving the film transport means after elapse of one-twelfth of the rotational time when a number of level transitions of the signal generated from the information reading means is greater than a predetermined first set up value.

3. An apparatus for reading photographic information stored on a film cartridge for an advanced photo system camera, comprising:

information reading means comprising an optical sensor for reading the photographic information and for generating a signal according to the photographic information;

film transport means for rotating a film cartridge spool to wind a film into and out of the film cartridge; and operation control means for determining a state of the film cartridge based on the signal generated by the information reading means by determining whether a level of the signal generated from the information reading means changes while a predetermined setup time elapses from a start of film rotation, and for setting a stop position of the film cartridge spool according to the state of the film cartridge, wherein, when said operation control means determines that a level of the signal generated from the information reading means changes while a predetermined setup time elapses from the start of film rotation, said operation control means counts a number of level transitions of the signal generated from the information reading means until a non-recording zone for photographic information is detected, and identifies the state of the film cartridge as a partial state when the number of level transitions of the signal is more than a predetermined second setup value.

4. The apparatus of claim 3, wherein said operation control means wherein, in response to identifying the state of the film cartridge to be the partial state, said operation control means calculates a rotational time of the film cartridge spool when film rotation is complete, drives the film transport means for winding the film, and stops driving the film transport means after one-half of the rotational time elapses when the number of level transitions of the signal generated from the information reading means is greater than predetermined first setup value.

5. An apparatus for reading photographic information stored on a film cartridge for an advanced photo system camera, comprising:

information reading means comprising an optical sensor for reading the photographic information and for generating a signal according to the photographic information;

film transport means for rotating a film cartridge spool to wind a film into and out of the film cartridge; and operation control means for determining a state of the film cartridge based on the signal generated by the information reading means by determining whether a level of the signal generated from the information reading means changes while a predetermined setup time elapses from a start of film rotation, and for setting a stop position of the film cartridge spool according to the state of the film cartridge, wherein, when said operation control means determines that the level of the signal generated from the information reading means changes while a predetermined setup time elapses from the start of film rotation, said operation control means counts a number of level transitions of the signal generated from the information reading means until a non-recording zone for photographic information is detected, and identifies the state of the film cartridge as an exposed state when the number of level transitions of the signal is more than a predetermined third setup value, but not more than a predetermined fourth setup value.

6. The apparatus of claim 5, wherein, in response to identifying the state of the film cartridge to be the exposed state, said operation control means calculates a rotational time of the film cartridge spool when film rotation is complete, drives the film transport means for winding the film, and stops driving the film transport means when the number level transitions of the signal generated from the information reading means is equal to a predetermined fifth setup value.

7. An apparatus for reading photographic information stored on a film cartridge for an advanced photo system camera, comprising:

information reading means comprising an optical sensor for reading the photographic information and for generating a signal according to the photographic information;

film transport means for rotating a film cartridge spool to wind a film into and out of the film cartridge; and operation control means for determining a state of the film cartridge based on the signal generated by the information reading means by determining whether a level of the signal generated from the information reading means chances while a predetermined setup time elapses from a start of film rotation, and for setting a stop position of the film cartridge spool according to the state of the film cartridge wherein, when said operation control means determines that a level of the signal generated from the information reading means changes while a predetermined setup time elapses from the start of film rotation, said operation control means counts a number of level transitions of the signal generated from the information reading means until a non-recording zone for photographic information is detected, and identifies the state of the film cartridge as a processed state when the number of level transitions of the signal is not more than a predetermined sixth setup value.

8. The apparatus of claim 7, wherein, in response to identifying the state of the film cartridge to be the processed state, said operation control means drives the film transport means for winding the film, and stops driving the film transport means when the number of levels transitions of the signal generated from the information reading means is equal to a predetermined seventh setup value.

9. A method for reading photographic information for an advanced photo system camera, comprising the steps of:

reading the photographic information when rewinding a film of a loaded film cartridge;

determining a state of the film cartridge according to the photographic information by determining whether a signal level corresponding to the read photographic information changes during a predetermined setup time period beginning from the start of film rewinding; and parking the film at a predetermined position according to the state of the film cartridge, wherein said step of determining a state of the film cartridge according to the photographic information identifies the state of the film cartridge as an unexposed state when the signal level does not change during the setup time period.

10. The method of claim 9, wherein, in response to identifying the state of film cartridge to be the unexposed state, said step of parking the film calculates a rotational time of a film cartridge spool when film rewinding terminates; and stops the film after one-twelfth of the rotational time elapses when a number of signal level transitions is greater than a predetermined first setup value.

11. A method for reading photographic information for an advanced photo system camera, comprising the steps of:

reading the photographic information when rewinding a film of a loaded film cartridge;

determining a state of the film cartridge according to the photographic information by determining whether a signal level corresponding to the read photographic information changes during a predetermined setup time period beginning from the start of film rewinding; and parking the film at a predetermined position according to the state of the film wherein said step of determining the state of the film cartridge according to the photographic information counts a number of signal level transitions, when the signal level changes during the setup time period, until a non-recording zone for photographic information is detected; and identifies the state of the film cartridge as a partial state when the number of signal level transitions is more than a predetermined second setup value.

12. The method of claim 11, wherein, in response to identifying the state of film cartridge to be the partial state, said step of parking the film calculates a rotational time of a film cartridge spool of the when the film rewinding is complete; and stops the film after one half of the rotational time elapses when the number of signal level transitions is greater than a predetermined first setup value.

13. A method for reading photographic information for an advanced photo system camera, comprising the steps of:

reading the photographic information when rewinding a film of a loaded film cartridge;

determining a state of the film cartridge according to the photographic information by determining whether a signal level corresponding to the read photographic information changes during a predetermined setup time period beginning from the start of film rewinding; and parking the film at a predetermined position according to the state of the film cartridge, wherein said step of determining the state of the film cartridge according to the photographic information counts a number of signal level transitions, until a non-recording zone for photographic information is detected; and identifies the state of the film cartridge as an exposed state when the number of signal level transitions is more than a predetermined third setup value, but not more than the predetermined fourth setup value.

14. The method of claim 13, wherein, in response to identifying the state of film cartridge to be the exposed state, said step of parking the film calculates a rotational time of a film cartridge spool when film rewinding terminates; and stops the film when the number of signal level transitions is equal to a predetermined fifth setup value.

15. A method for reading photographic information for an advanced photo system camera, comprising the steps of:

reading the photographic information when rewinding a film of a loaded film cartridge;

determining a state of the film cartridge according to the photographic information by determining whether a signal level corresponding to the read photographic information changes during a predetermined setup time period beginning from the start of film rewinding; and parking the film at a predetermined position according to the state of the film cartridge, wherein said step of determining the state of the film cartridge according to the photographic information counts a number of signal level transitions until a non-recording zone for photographic information is detected; and identifies the state of the film cartridge as an processed state when the number of signal level transitions is not more than a predetermined sixth setup value.

16. The method of claim 15, wherein, in response to identifying the state of film cartridge to be the processed state, said step of parking the film stops the film when the number of signal level transitions is equal to a predetermined seventh setup value.

* * * * *

UNITED STATES PATENT AND TRADEMARK OFFICE
CERTIFICATE OF CORRECTION

PATENT NO. : 5,940,638
DATED : August 17, 1999
INVENTOR(S) : Byung-Su KIM

It is certified that error appears in the above-identified patent and that said Letters Patent is hereby corrected as shown below:

Claim 2, col. 7, line 33, "set up" should read --setup--.

Claim 7, col. 8, line 61, "chances" should read --changes--.

Claim 7, col. 8, line 64, after "cartridge", insert --,--.

Claim 11, col. 9, line 52, after "film", insert --cartridge,--.

Claim 12, col. 10, line 4, delete "of the".

Claim 15, col. 10, line 53, "an processed" should read --a processed--.

Signed and Sealed this

Fourteenth Day of November, 2000

Attest:

Attesting Officer

Q. TODD DICKINSON

Director of Patents and Trademarks